(12) United States Patent
Watanabe et al.

(10) Patent No.: US 6,832,596 B2
(45) Date of Patent: Dec. 21, 2004

(54) FUEL INJECTION SYSTEM AND FUEL INJECTING METHOD FOR INTERNAL COMBUSTION ENGINE

(75) Inventors: Tsuguo Watanabe, Saitama (JP); Osamu Nishioka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/645,496

(22) Filed: Aug. 22, 2003

(65) Prior Publication Data

US 2004/0045534 A1 Mar. 11, 2004

(30) Foreign Application Priority Data

Sep. 10, 2002 (JP) ........................................ 2002-264173

(51) Int. Cl.[7] .............................................. F02D 41/22
(52) U.S. Cl. ........................ 123/333; 128/479; 128/481
(58) Field of Search ............................... 123/299, 333, 123/478, 479, 481

(56) References Cited

U.S. PATENT DOCUMENTS

| | | | | |
|---|---|---|---|---|
| 4,375,207 A | * | 3/1983 | Sieber et al. ................ | 123/333 |
| 4,768,486 A | * | 9/1988 | Koike et al. ................. | 123/478 |
| 5,287,279 A | * | 2/1994 | Anan .......................... | 123/481 |
| 5,559,703 A | * | 9/1996 | Iwata et al. ................. | 123/481 |
| 5,758,623 A | * | 6/1998 | Nitta et al. ................. | 123/470 |
| 5,775,282 A | * | 7/1998 | Smith ......................... | 123/576 |
| 6,041,757 A | * | 3/2000 | Kadota ....................... | 123/333 |
| 6,467,465 B1 | * | 10/2002 | Lorts .......................... | 123/472 |
| 6,508,233 B1 | * | 1/2003 | Suhre et al. ................ | 123/299 |

FOREIGN PATENT DOCUMENTS

| | | |
|---|---|---|
| JP | 04183949 A | 6/1992 |
| JP | 10196440 A | 7/1998 |

* cited by examiner

Primary Examiner—Erick Solis
(74) Attorney, Agent, or Firm—Birch, Stewart, Kolasch & Birch, LLP

(57) ABSTRACT

An internal combustion engine in which fuel injection valves are arranged on the upstream side and on the downstream side of the throttle valve respectively, in which process values such as the engine speed and the vehicle speed cause fuel injection to be accurately restricted at predetermined upper limit values. A total injection quantity determination unit determines total quantity Qtotal of fuel to be injected from the upstream side and downstream side fuel injection valves. An injection rate determination unit determines an injection rate Rupper of the upstream injection valve. An injection quantity restriction unit restricts fuel injection of each of the fuel injection valves when process values such as the vehicle speed and the engine speed reach or approach the predetermined upper limit value. The injection quantity determination unit determines the injection quantity Qupper of the upstream injection valve and the injection quantity Qlower of the downstream injection valve.

17 Claims, 9 Drawing Sheets

|  | Cne00 | Cne01 | Cnei | Cne14 |
|---|---|---|---|---|
| Cth0 | Rupper(0,0) | Rupper(1,0) | Rupper(i,0) | Rupper(14,0) |
| Cth1 | : | : | : | : |
| Cth2 | : | : | : | : |
| : | : | : | : | : |
| Cthj | Rupper(0,j) | Rupper(1,j) | Rupper(i,j) | Rupper(14,j) |
| : | : | : | : | : |
| Cth7 | : | : | : | : |
| Cth8 | : | : | : | : |
| Cth9 | Rupper(0,9) | Rupper(1,9) | Rupper(i,9) | Rupper(14,9) |

FIG. 3

1: Normal injection
0: FC (Fuel cut)

FUEL INJECTION SYSTEM AND FUEL INJECTING METHOD FOR INTERNAL COMBUSTION ENGINE

CROSS-REFERENCE TO RELATED APPLICATION

The present application claims priority under 35 USC 119 to Japanese Patent Application No. 2002-264173 filed on Sep. 10, 2002, the entire contents thereof is hereby incorporated by reference.

BACKGROUND OF THE INVENTION

1. Field of the Invention

The present invention relates to a fuel injection system and fuel injecting method for an internal combustion engine, and more particularly to a fuel injection system in an internal combustion engine in which respective fuel injection valves on the upstream and downstream sides have been arranged with a throttle valve interposed therebetween.

2. Description of Background Art

When the fuel injection valve is provided upstream from the throttle valve, the volumetric efficiency is improved because heat is taken from intake air when injection fuel vaporizes. Therefore, the engine output can be increased as compared with when the fuel injection valve is provided downstream from the throttle valve.

When, however, the fuel injection valve is provided on the upstream side, a response lag occurs in fuel transport as compared with when the fuel injection valve is provided downstream from the throttle valve. This response lag occurs because the distance between the upstream side fuel injection port and a combustion chamber inevitably becomes longer.

There has been disclosed in, for example, Japanese Patent Laid-Open Nos. 4-183949 and 10-196440, a fuel injection system in which fuel injection valves have been provided upstream from and downstream from the intake pipe respectively with the throttle valve interposed therebetween in order to improve the engine output and cope with the response lag.

FIG. 11 is a cross-sectional view showing a major portion of an internal combustion engine in accordance with the background art in which two fuel injection valves have been arranged, and with the throttle valve 52 of the intake pipe 51 interposed, there have been arranged a first fuel injection valve 50a on the downstream side and a second fuel injection valve 50b on the upstream side.

When protecting an engine mounted with an electronic-controlled fuel injection valve thereon from over-speed, when restricting the engine output to an upper limit value, or when restricting the speed of a vehicle mounted with the engine concerned thereon to an upper limit speed, there has been known a technique for prohibiting an operation of the fuel injection valve or interrupting fuel supply by replacing with the thinned-out injection.

In an engine in which fuel injection valves have been provided on the upstream side and on the downstream side respectively with the throttle valve interposed therebetween, however, the distance between the fuel injection port of the fuel injection valve provided on the upstream side and the cylinder becomes far to cause a response lag. As a result, a so-called overshoot occurs, in which even though fuel injection may be restricted after it is detected that the process values such as the engine speed and the vehicle speed have reached the upper limit, these process values exceed the upper limit values. For this reason, in an engine equipped with the upstream fuel injection valve and the downstream fuel injection valve, the upper limit value had to be set to be lower than the original upper limit value.

SUMMARY AND OBJECTS OF THE PRESENT INVENTION

It is an object of the present invention to solve the problem of the conventional technique described above, and to provide a fuel injection system for an internal combustion engine which has been arranged in such a manner that process values such as the engine speed, the vehicle speed or the engine output are accurately restricted at the upper limit values.

In order to achieve the above-described object, the fuel injection system for an internal combustion engine of the present invention is equipped with an intake pipe equipped with a throttle valve, an upstream fuel injection valve provided upstream from the throttle valve and a downstream fuel injection valve provided downstream from the throttle valve, and includes the following novel aspects:

According to a first aspect of the present invention, the fuel injection system is provided with means for detecting process values representing an operating state and a traveling state of the internal combustion engine, and means for restricting fuel injection due to each of the fuel injection valves when the process values have reached predetermined upper limit values, wherein the upper limit values are caused to differ between the upstream fuel injection valve and the downstream fuel injection valve.

(2) According to a second aspect of the present invention, the fuel injection system includes means for detecting process values representing an operating state and a traveling state of an internal combustion engine; means for detecting whether or not the process values have reached quasi-upper limit values at this side of predetermined upper limit values; means for restricting, when the process values reach the quasi-upper limit values, fuel injection due to the upstream fuel injection valve; and means for restricting, when the process values reach the upper limit values, fuel injection due to the downstream fuel injection valve.

According to the first aspect (1) of the present invention, since it is possible to stop the upstream fuel injection valve and the downstream fuel injection valve at different times, if the stop timing is set in accordance with relative positional relationship of both valves, it will become possible to arbitrarily adjust fuel distribution within the fuel injection area.

According to the second aspect (2) of the present invention, since in an upward course of the process values, fuel injection due to the upstream injection valve can be stopped earlier than the downstream injection valve, it is possible to prevent the overshoot of the process values resulting from the response lag in the upstream injection valve.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a view showing one example of an injection rate table;

DETAILED DESCRIPTION OF THE PREFERRED EMBODIMENTS

Figure 1:
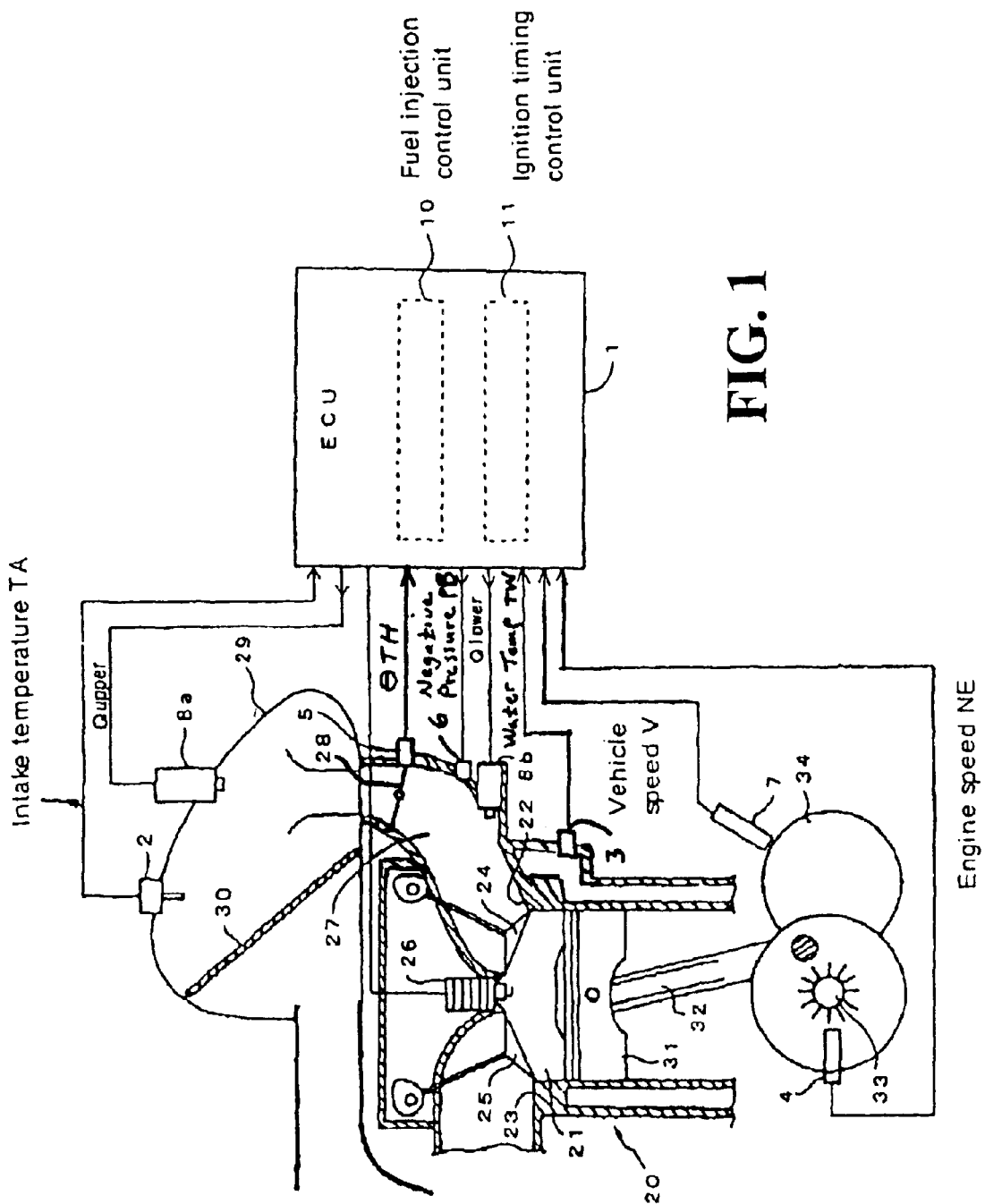
FIG. 1 is a general block diagram showing a fuel injection system according to one embodiment of the present invention.

FIG. 1 is a general block diagram showing a fuel injection system according to one embodiment of the present invention. An intake port 22 and an exhaust port 23. are proved on a combustion chamber 21 of the engine 20. Each port 22 and 23 is provided with an intake valve 24 and an exhaust valve 25 respectively. Further, an ignition plug 26 is provided.

On an intake passage 27 leading to the intake port 22, there are provided a throttle valve 28 for adjusting intake air quantity in accordance with its opening θTH, a throttle sensor 5 for detecting the opening θTH and a vacuum sensor 6 for detecting intake manifold vacuum PB. At a terminal of the intake passage 27, there is provided an air cleaner 29. Within the air cleaner 29, there is provided an air filter 30, and open air is taken into the intake passage 27 through this air filter 30.

In the intake passage 27, there is arranged a downstream injection valve 8b downstream from the throttle valve 28. On the air cleaner 29 upstream from the throttle valve 28, there is arranged an upstream injection valve 8a so as to point to the intake passage 27, and there is provided an intake temperature sensor 2 for detecting intake (atmospheric) temperature TA.

Opposite to a crankshaft 33 coupled to a piston 31 of the engine 20 through a connecting rod 32, there is arranged an engine speed sensor 4 for detecting engine speed NE on the basis of a rotation angle of a crank. Further, opposite to a rotor 34 such as a gear which is coupled to the crankshaft 33 for rotation, there is arranged a vehicle speed sensor 7 for detecting vehicle speed V. On a water jacket formed around the engine 20, there is provided a water temperature sensor 3 for detecting cooling water temperature TW representing the engine temperature.

An ECU (Engine Control Unit) 1 includes a fuel injection control unit 10 and an ignition timing control unit 11. The fuel injection control unit 10 outputs, on the basis of signals (process values) obtained by detecting by each of the above-described sensors, injection signals Qupper and Qlower to each injection valve 8a, 8b on the upstream and downstream sides. Each of these injection signals is a pulse signal having pulse width responsive to the injection quantity, and each injection valve 8a, 8b is opened by time corresponding to this pulse width to inject the fuel. The ignition timing control unit 11 controls ignition timing of an ignition plug 26.

Figure 2:
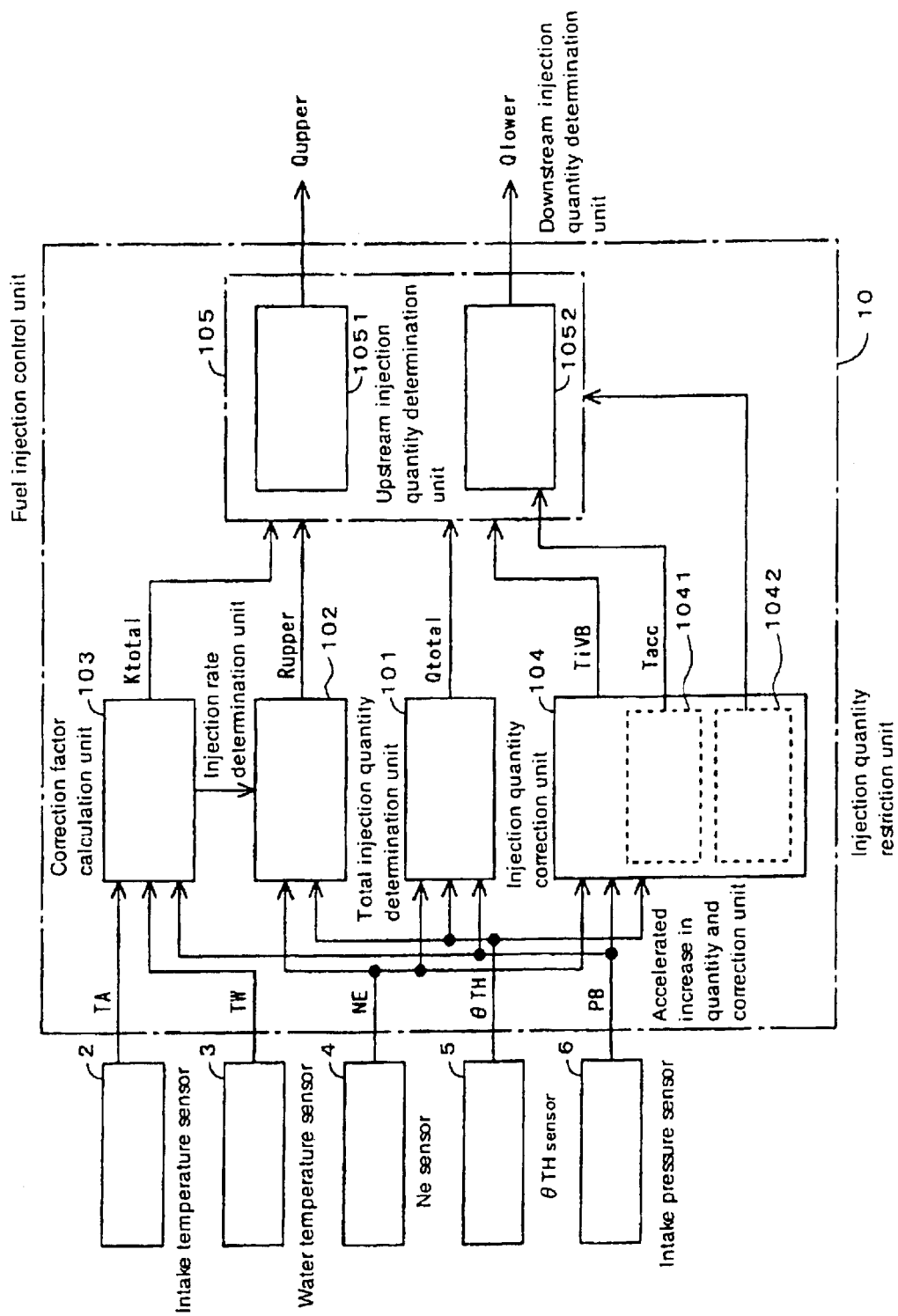
FIG. 2 is a functional block diagram for a fuel injection control unit 10.

FIG. 2 is a functional block diagram for the fuel injection control unit 10, and the same symbols as in the foregoing represent the same or equal portions.

A total injection quantity determination unit 101 determines a total quantity Qtotal of fuel to be injected from each fuel injection valve 8a, 8b on the upstream and downstream sides on the basis of the engine speed NE, the throttle opening θTH and intake pressure PB. An injection rate determination unit 102 refers to an injection rate table on the basis of the engine speed NE and throttle opening θTH to determine an injection rate Rupper of the upstream injection valve 8a. An injection rate Rlower of the downstream injection valve 8b is determined as (1-Rupper).

FIG. 3 is a view showing an example of the injection rate table, and in the present embodiment. The injection rate map is constituted with 15 items (Cne00 to Cne14) as a reference as the engine speed NE, and with 10 items (Cth0 to Cth9) as a reference as the throttle opening θTH, and the injection rate Rupper of the upstream injection valve 8a is registered in advance at each combination of each engine speed NE and the throttle opening θTH. The injection rate determination unit 102 determines an injection rate Rupper corresponding to the engine speed NE and the throttle opening θTH that have been detected, by means of the four-point interpolation on the injection rate map.

Reverting to FIG. 2, a correction factor calculation unit 103 calculates a manifold air pressure correction factor Kpb, an intake temperature correction factor Kta and cooling water temperature correction factor Ktw, and the like, on the basis of process values such as the manifold air pressure PB, the intake temperature TA and the cooling water temperature TW, and further calculates a total correction factor Ktotal by integrating these all correction factors.

In an injection quantity correction unit 104, an accelerated increase in quantity correction unit 1041 increases and corrects the injection quantity of the downstream injection valve 8b for acceleration during acceleration. An injection quantity restriction unit 1042 restricts fuel injection due to each of the fuel injection valves 8a, 8b when the process values such as the vehicle speed and the engine speed have reached or approached predetermined upper limit values.

In an injection quantity determination unit 105, an upstream injection quantity determination unit 1051 determines injection quantity Qupper of the upstream injection valve 8a on the basis of the injection rate Rupper and the total injection quantity Qtotal. A downstream injection quantity determination unit 1052 determines the injection quantity Qlower of the downstream injection valve 8b on the basis of the upstream injection quantity Qupper and the total injection quantity Qtotal.

Next, with reference to a flowchart of FIG. 4, the description will be made of an operation of the fuel injection control unit 10 in detail. This handling is executed by interruption due to a crank pulse in a predetermined stage.

In a step S1, the process values such as the engine speed NE, the throttle opening θTH, manifold air pressure PB, intake temperature TA and cooling water temperature TW are detected by each of the sensors. In a step S2, in the total injection quantity determination unit 101, total quantity Qtotal of fuel to be injected from each fuel injection valve 8a, 8b on the upstream side and on the downstream side is determined on the basis of the engine speed NE, the throttle opening θTH and the intake pressure PB. In a step S3, in the injection rate determination unit 102, an injection rate table is referred to on the basis of the engine speed Ne and the throttle opening θTH, and an injection rate Rupper of the upstream injection valve 8a is determined.

In a step S4, when the vehicle speed has approached a predetermined upper limit speed, "High-rotation high-vehicle speed fuel cut (FC) handling" for restricting fuel injection of the upstream and downstream fuel injection valve 8a, 8b is executed.

Figure 5:
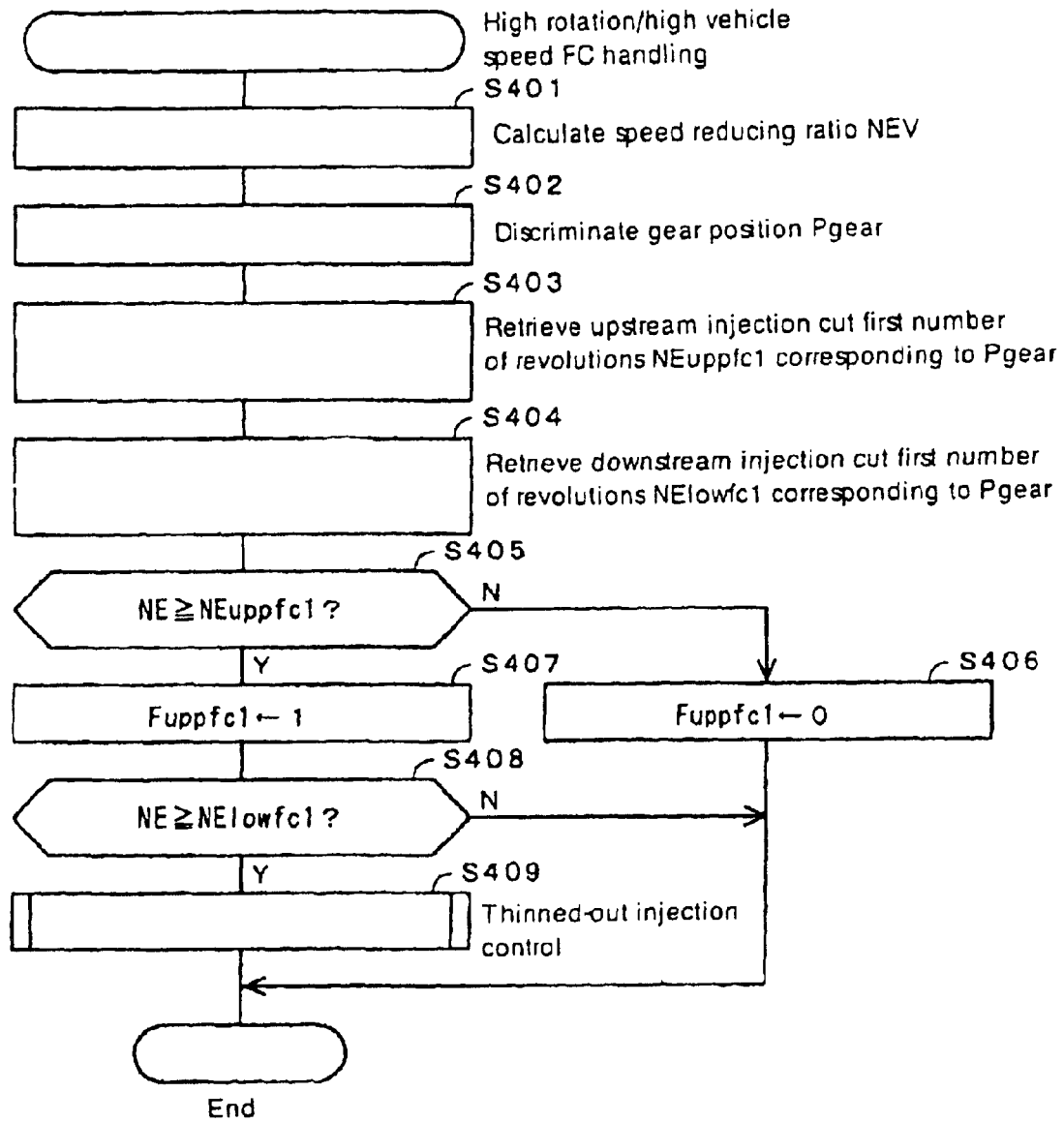
FIG. 5 is a flowchart showing high rotation/high vehicle speed FC handling.

FIG. 5 is a flowchart showing a procedure of the "High-rotation high-vehicle speed FC handling", which is mainly executed by the injection quantity restriction unit 1042.

In a step S401, the present speed reducing ratio NEV (NE/V) is calculated on the basis of the engine speed NE and the vehicle speed V. In a step S402, the present gear position (or gear ratio) Pgear is discriminated on the basis of the speed reducing ratio NEV.

In a step S403, the upstream injection cut map (not shown) is referred to on the basis of the discrimination result of the gear position Pgear, and a first engine rotation frequency NEuppfc1 at which the upstream valve injection is cut corresponding to the present gear position Pgear is retrieved. The first engine rotation frequency NEuppfc1 at which the upstream valve injection is cut has been set in such a manner that as the gear position becomes higher, it becomes lower with the exception of cases at low gear positions (first gear or second gear).

In a step S404, the downstream injection cut map (not shown) is referred to on the basis of the discrimination result of the gear position Pgear, and a first engine rotation frequency NElowfc1 at which the downstream valve injection is cut corresponding to the present gear position Pgear is retrieved. The first engine rotation frequency NElowfc1 at which the downstream valve injection is cut has also been set in such a manner that as the gear position becomes higher, it becomes lower with the exception of cases at low gear positions.

Since the engine rotation frequency NEuppfc1 at which the upstream valve injection is cut and the engine rotation frequency NElowfc1 at which the downstream valve injection is cut satisfy a relationship of NEuppfc1<NElowfc1 if they are the same in the gear position Pgear, the upstream fuel injection valve 8a is always to be injection-cut prior to the downstream fuel injection valve 8b.

In a step S405, the engine rotation frequency NEuppfc1 at which the upstream valve injection is cut is retrieved in the step S403 is compared with the engine speed NE. If NE<NEuppfc1, the sequence will proceed to a step S406 because the injection cut on the upstream side is not required, and a first upstream injection cut flag Fuppfc1 will be reset. In contrast, if NE.NEuppfc1, the sequence will proceed to a step S407 because the injection cut on the upstream side is required, and the first flag Fuppfc1 will be set.

In a step S408, the engine rotation frequency NElowfc1 at which the downstream valve injection is cut is retrieved in the step S404 is compared with the engine speed NE. If NE.NEuppfc, the sequence will proceed to a step S409 to execute the "thinned-out injection handling". In this "thinned-out injection handling", it is determined on the basis of a predetermined thinned-out pattern whether or not fuel injection of each cylinder is prohibited.

Figure 6:
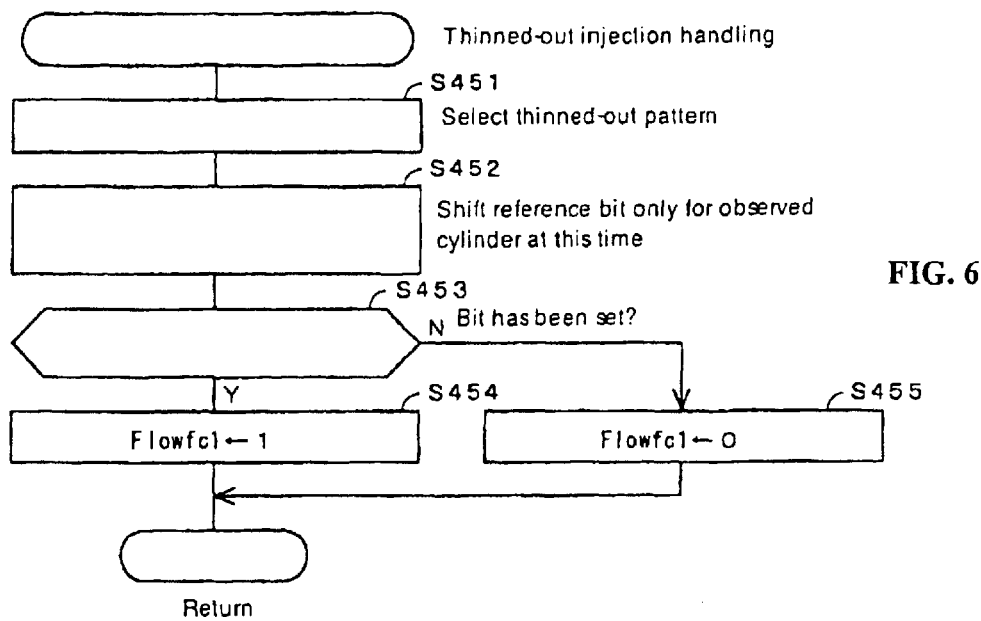
FIG. 6 is a flowchart showing thinned-out injection handling.

FIG. 6 is a flowchart showing a procedure of the "thinned-out injection handling", and is mainly executed by the injection quantity restriction unit 1042.

Figure 7:
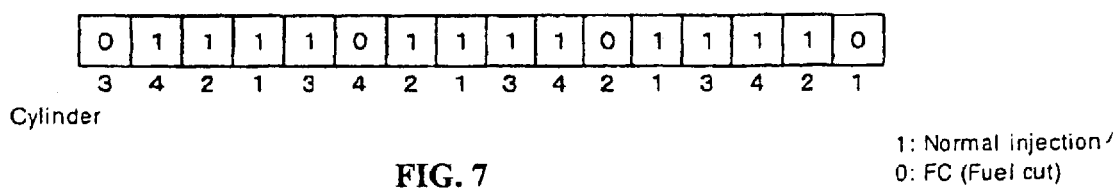
FIG. 7 is a view showing an example of a thinned-out pattern.

In a step S451, the thinned-out pattern is selected on the basis of the gear position Pgear. FIG. 7 is a view showing an example of the thinned-out pattern prepared in advance for each above-described gear position Pgear, and in this case, bit 1 (normal injection) or bit 0 (FC) has been registered for each cylinder.

Figure 8:
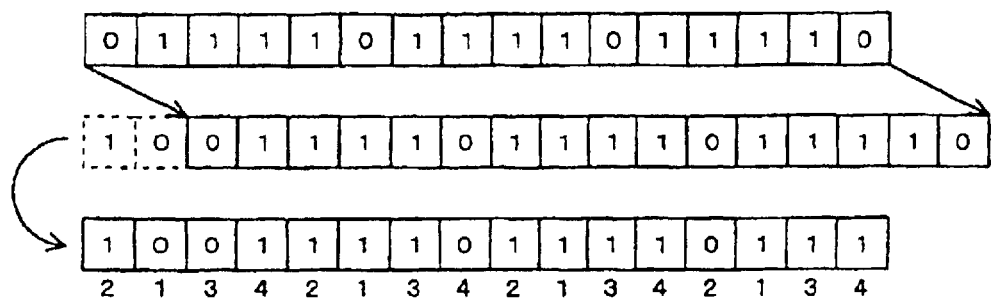
FIG. 8 is a view schematically representing a shift method of the thinned-out pattern.

In a step S452, the thinned-out pattern is shifted only for the observed cylinder at this time. FIG. 8 is a view schematically representing a shift method of the thinned-out pattern, and in this case, since the observed cylinder is a fourth cylinder, the thinned-out pattern has been shifted by an amount corresponding to two cylinders (two bits) in the right direction in the drawing.

In a step S453, the bit of the observed cylinder is referred to on the thinned-out pattern after the shift, and if this has been set, in a step S454, a downstream injection cut first flag Flowfc1 is set. If the bit of the observed cylinder has not been set, in a step S455, the first downstream injection valve cut flag Flowfc1 will be reset.

When the "High-rotation/high-vehicle speed FC handling" is completed as described above, reverting to FIG. 4, in a step S5, when the engine output approaches a predetermined upper limit output, an "Output restriction fuel cut (FC) handling" for restricting the fuel injection of the upstream and downstream injection valves is executed.

Figure 9:
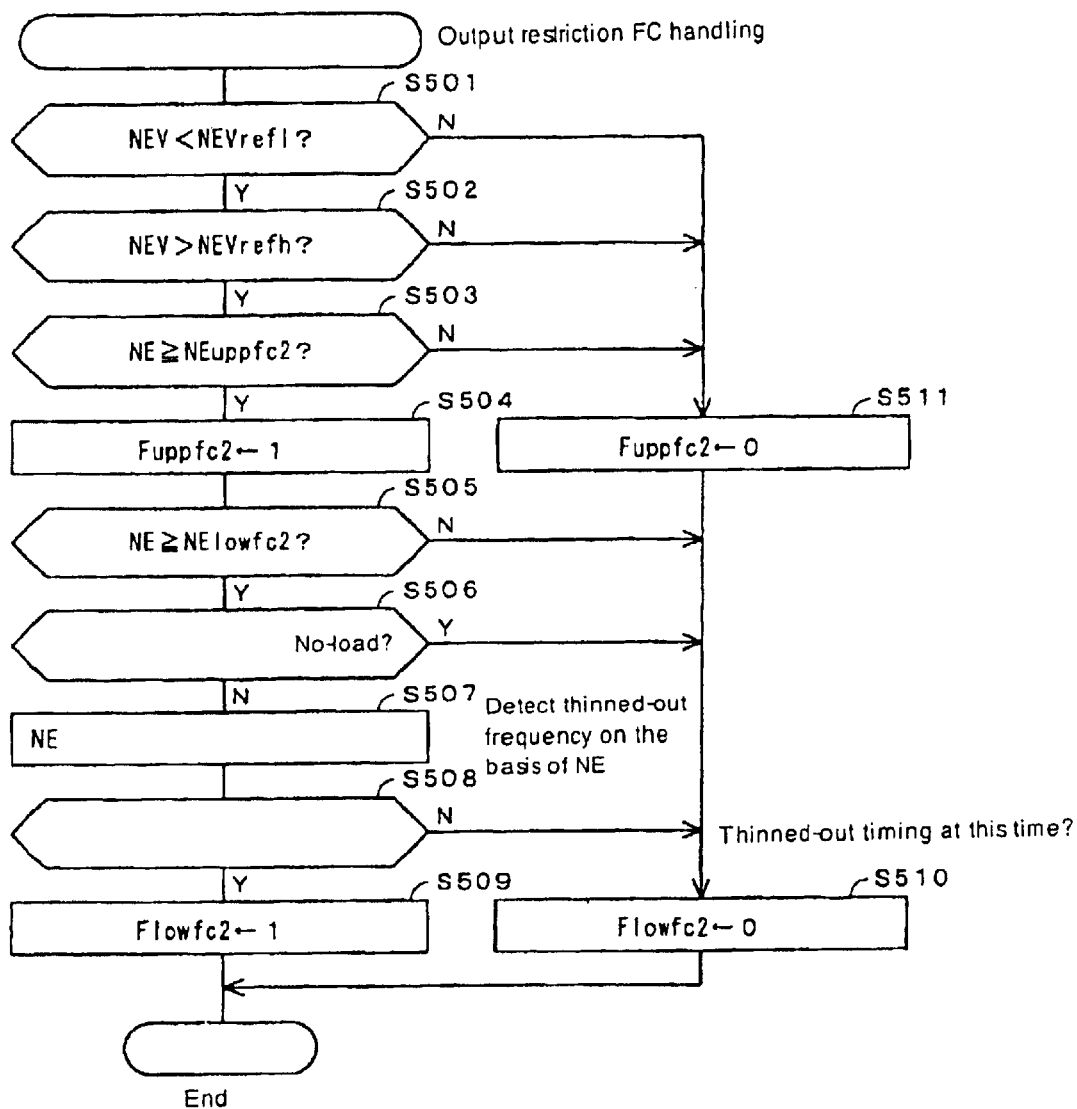
FIG. 9 is a flowchart showing output restriction FC handling.

FIG. 9 is a flowchart showing a procedure of the "Output restriction FC handling", and is mainly executed by the injection quantity restriction unit 1042.

In a step S501, the present speed reducing ratio NEV is compared with a lower limit speed reducing ratio NEVref1, and if NEV<NEVref1, the sequence will proceed to a step S502. In the step S502, the present speed reducing ratio NEV is compared with an upper limit speed reducing ratio NEVrefh, and if NEV>NEVrefh, the sequence will proceed to a step S503. In the step S503, the present engine speed NE is compared with a second predetermined engine rotation frequency NEuppfc2 (fixed value), and if NE.NEuppfc2, in a step S504, a second upstream valve injection cut flag Fuppfc2 is set (injection prohibited). In this respect, if any of the judgment in the steps S501 to S503 is negative, the sequence will proceed to a step S511, and the second upstream valve injection cut flag Fuppfc2 is reset (injection permitted).

In a step S505, the engine speed NE is compared with second predetermined engine rotation frequency NElowfc2 (fixed value), and if NE.NElowfc2, the sequence will proceed to a step S506 in order to cut also the downstream valve injection. Since the second engine rotation frequency NEuppfc2 for cutting the upstream valve injection and the second engine rotation frequency NElowfc2 for cutting the downstream valve injection have a relationship of NEuppfc2<NElowfc2. Thus, the upstream fuel injection valve 8a is always to be injection-cut prior to the downstream fuel injection valve 8b.

In a step S506, the engine load is discriminated, and if any other than non-load, the sequence will proceed to a step S507. In the step S507, a thinned-out frequency table (not shown) is referred to on the basis of the engine speed NE, and optimum thinned-out frequency of the downstream injection responsive to the engine speed NE is retrieved.

In a step S508, it is discriminated whether or not injection timing at this time is thinned-out timing, and if thinned-out timing, in a step S509, the second downstream injection cut flag Flowfc2 is set (injection prohibited). If any other than the thinned-out timing, in a step S510, the second flag Flowfc2 is reset (injection permitted).

Figure 4:
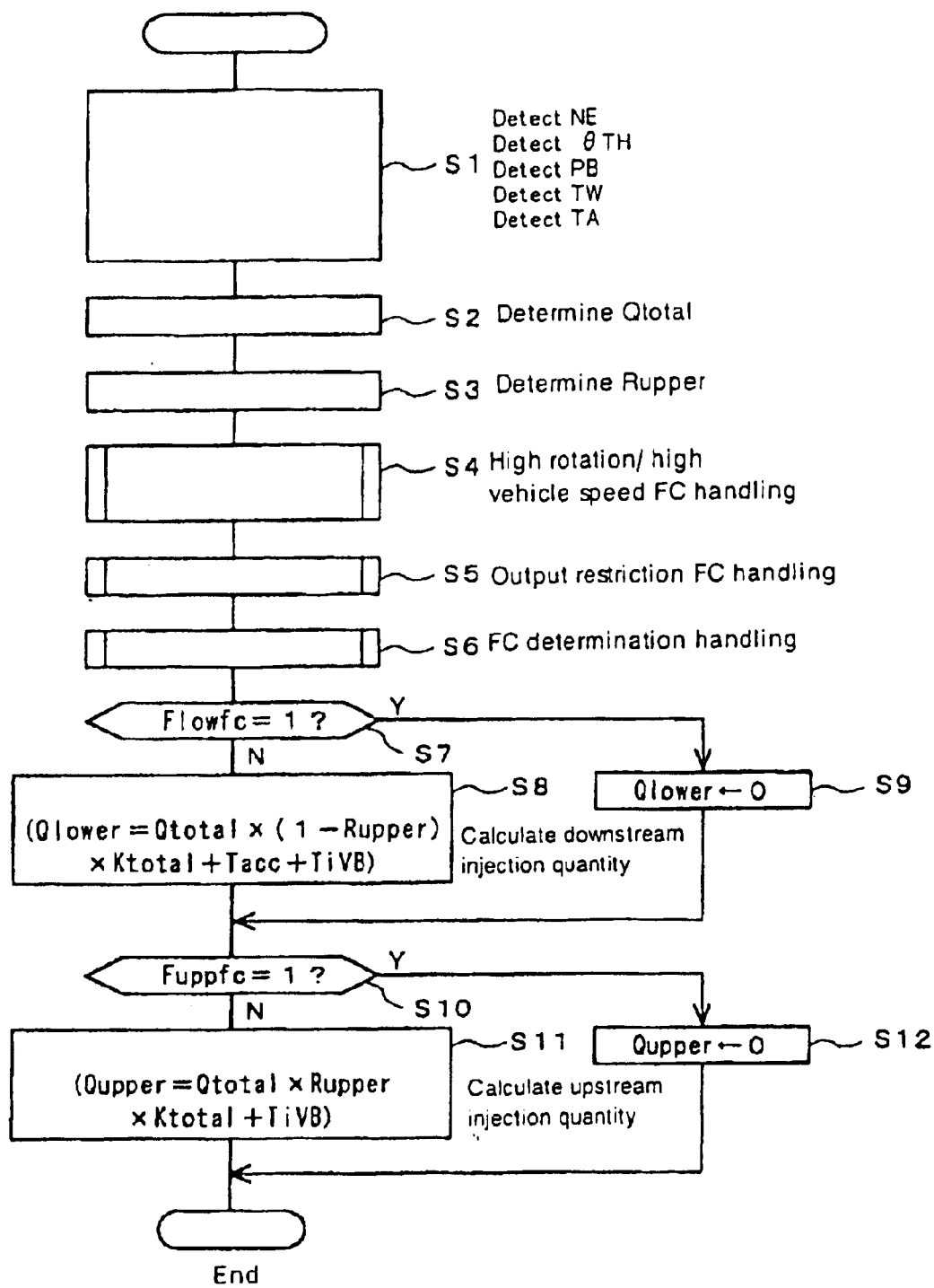
FIG. 4 is a flowchart showing a control procedure of fuel injection.

Reverting to FIG. 4, in a step S6, "FC determination handling" for determining presence or absence of fuel injection cut on the upstream and downstream sides is executed on the basis of the handling results of each FC handling in the steps S4, S5.

Figure 10:
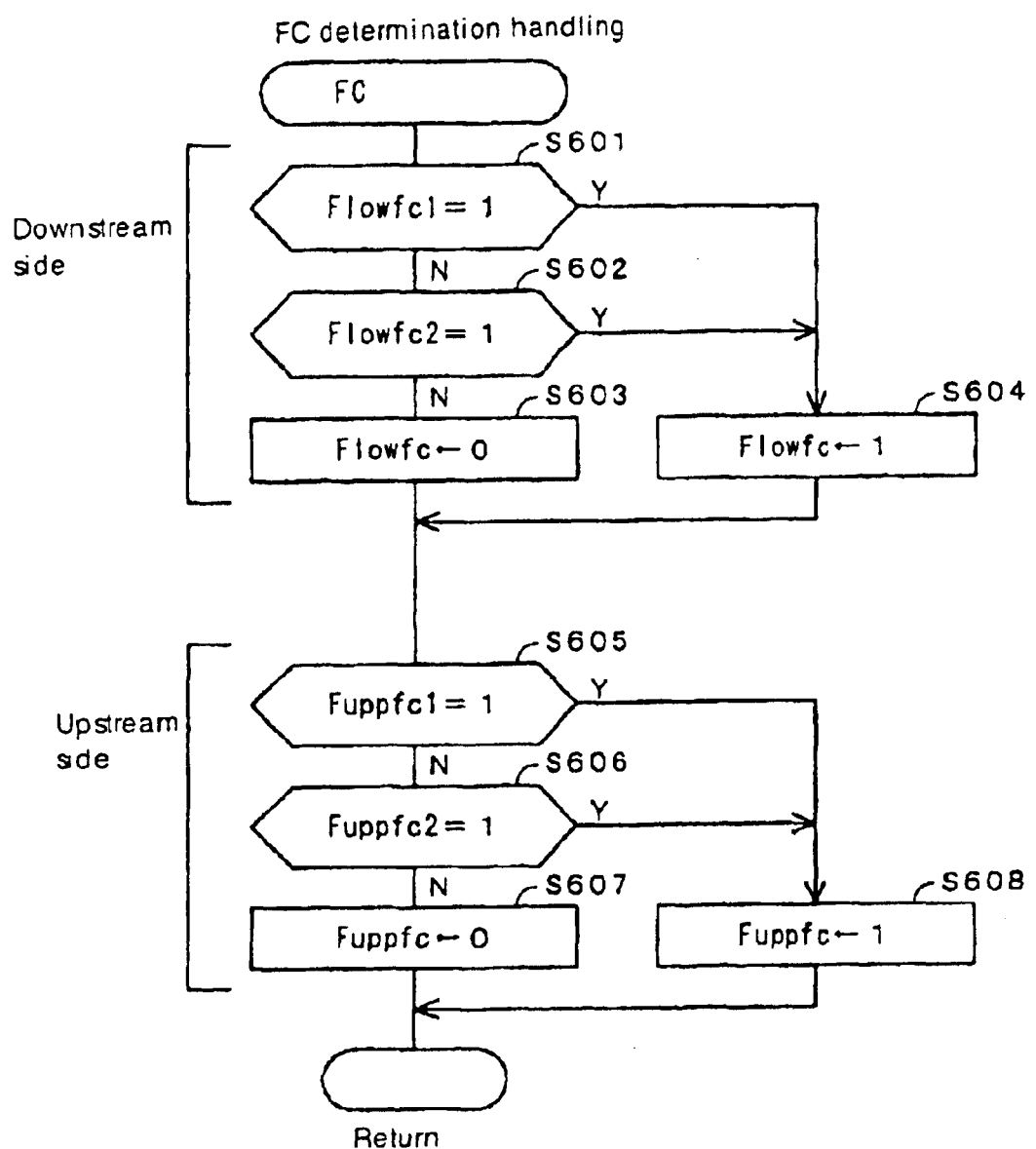
FIG. 10 is a flowchart showing the FC determination handling.
Figure 11:
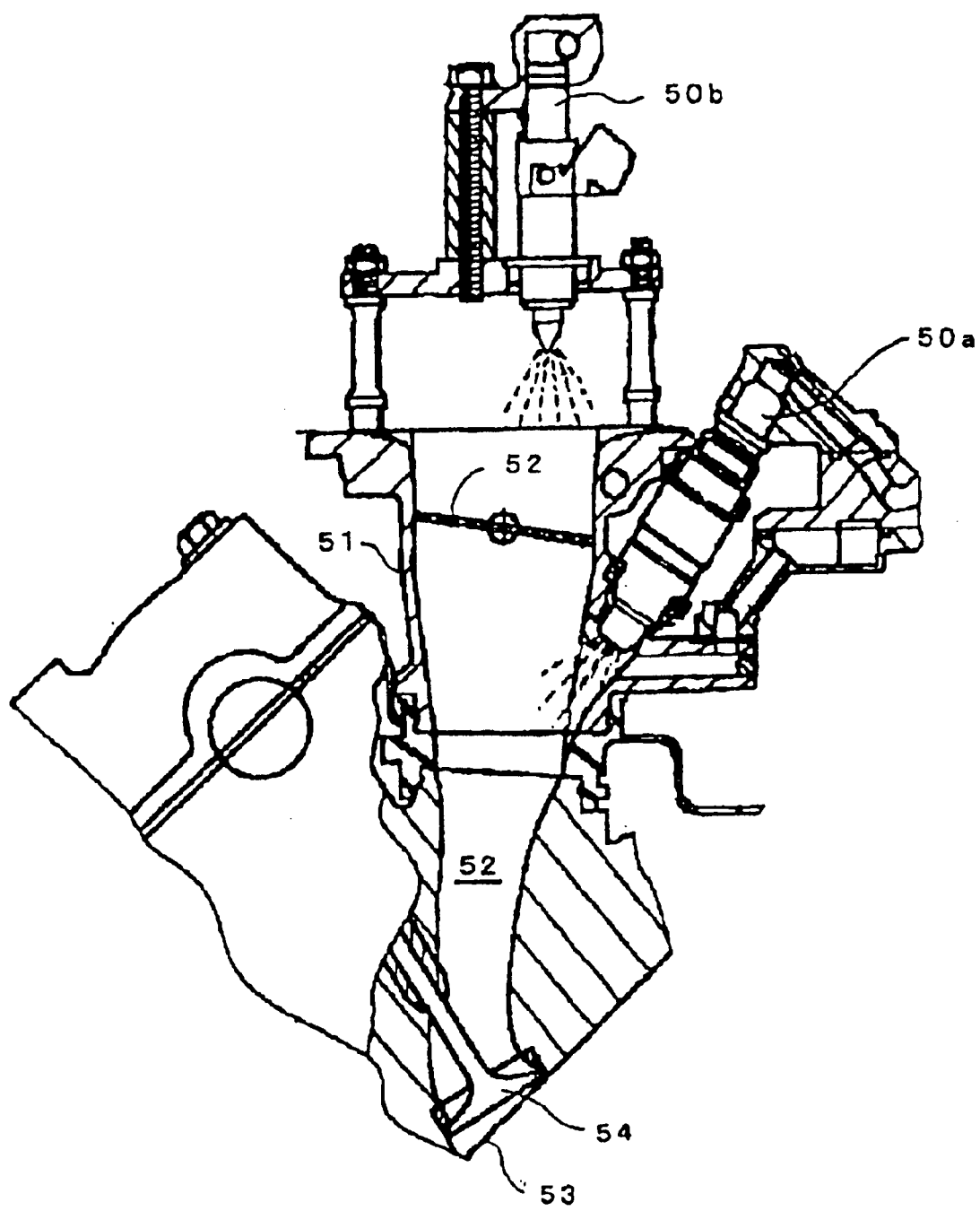
FIG. 11 is a cross-sectional view showing an internal combustion engine in accordance with the background art in which two fuel injection valves have been arranged.

FIG. 10 is a flowchart showing a procedure of the "FC determination handling", and in a step S601, the first downstream valve injection cut flag Flowfc1 is referred to, and if this has been reset, further in a step S602, the second downstream valve injection cut flag Flowfc2 is referred to. If this has also been reset, in a step S603, the downstream valve injection cut flag Flowfc is reset (injection permitted). In the steps S601, S602, if at least one of the first flag Flowfc1 and the second flag Flowfc2 has been set, in a step S604, the downstream valve injection cut flag Flowfc is set (injection prohibited).

In a step S605, the first upstream valve injection cut flag Fuppfc1 is referred to, and if this has been reset, further in a step S606, the second upstream valve injection cut flag Fuppfc2 is referred to. If this has also been reset, in a step S507, the upstream valve injection cut flag Fuppfc is reset (injection permitted). In the steps S605, S606, if at least one of the first flag Fuppfc1 and the second flag Fuppfc2 has been set, in a step S608, the upstream valve injection cut flag Fuppfc is set (injection prohibited).

Reverting to FIG. 4, in the step S7, the downstream valve injection cut flag Flowfc is referred to, and if this is in a reset state (injection permitted), in the step S8, the injection quantity Qlower of the downstream valve injection valve is calculated by adding, to a product of the total injection quantity Qtotal, the downstream valve injection rate (1 Rupper) and the total correction factor Ktotal obtained by calculating by the correction factor calculation unit 103, a predetermined accelerated increase quantity value Tacc obtained by further calculating by the accelerated increase in quantity correction unit 1041 and invalid injection time TiVB. The accelerated correction quantity Tacc is calculated as a function of a rate of change of, for example, the throttle opening θTH and the manifold air pressure PB. The invalid injection time TiVB is a time period during which of the intake-valve opening time, complete injection of fuel is not involved, and is determined by type and structure of the fuel injection valve.

In contrast to this, if the downstream valve injection cut flag Flowfc has been set determined by type and structure of the fuel injection valve.

In contrast to this, if the downstream valve injection cut flag Flowfc has been set (injection prohibited), in a step S9, the injection quantity Qlower is set to "0". That is, the injection on the downstream side is prohibited.

In a step S10, the upstream valve injection cut flag Fuppfc is referred to, and if this is in a reset state (injection permitted), in a step S11, the injection quantity Qupper of the upstream injection valve is calculated by further adding, to a product of the total injection quantity Qtotal, the upstream injection rate Rupper and the total correction factor Ktotal obtained by calculating by the correction factor calculation unit 103, invalid injection time TiVB.

In contrast to this, if the upstream valve injection cut flag Fuppfc has been set (injection prohibited), in a step S12, the injection quantity Qupper is set to "0". That is, the injection on the upstream side is prohibited.

According to the present invention, the following effects can be exhibited.

(1) Since it is possible to stop the upstream fuel injection valve and the downstream fuel injection valve at different times, if the stop timing is set in accordance with relative positional relationship of the two valve, it will be possible to arbitrarily adjust fuel distribution within the fuel injection area.

(2) Since in an upward course of the process value such as the engine speed and the vehicle speed, fuel injection due to the upstream injection valve can be stopped earlier than the downstream injection valve, it is possible to prevent the overshoot of the process value resulting from the response lag in the upstream injection valve.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel injection system for an internal combustion engine, comprising:

an intake pipe equipped with a throttle valve;

an upstream fuel injection valve provided upstream from said throttle valve; a downstream fuel injection valve provided downstream from said throttle valve;

means for detecting a process value representing an operating state or a traveling state of the internal combustion engine; and means for restricting fuel injection of each of said fuel injection valves when said process value reaches a predetermined upper limit value, wherein said upstream fuel injection valve and said downstream fuel injection valve differ in an upper limit value at which said fuel injection is restricted.

2. The fuel injection system for an internal combustion engine according to claim 1, wherein said means for restricting said fuel injection stops fuel of said upstream fuel injection valve and causes said downstream fuel injection valve to perform a thinned-out injection.

3. The fuel injection system for an internal combustion engine according to claim 1, further comprising an injection rate determination unit including a matrix of predetermined throttle opening and engine speed values for determining the upper limit value at which said fuel therein is restricted.

4. The fuel injection system for an internal combustion engine according to claim 1, wherein the upper limit value of the upstream fuel injection valve is lower than the upper limit value of the downstream fuel injection valve.

5. The fuel injection system for an internal combustion engine according to claim 1, wherein the fuel injection of the upstream fuel injection valve is stopped prior to the fuel injection of the downstream fuel injection valve.

6. The fuel injection system for an internal combustion engine according to claim 2, further comprising an injection quantity restriction unit having a predetermined thinned-out pattern for each of a plurality of gear positions.

7. The fuel injection system for an internal combustion engine according to claim 2, wherein said means for restricting said fuel injection stops fuel of said upstream fuel injection valve and causing said downstream fuel injection valve to perform the thinned-out injection is activated when an engine speed approaches a predetermined upper output limit.

8. A fuel injection system for an internal combustion engine, comprising:
   an intake pipe equipped with a throttle valve;
   an upstream fuel injection valve provided upstream from said throttle valve;
   a downstream fuel injection valve provided downstream from said throttle valve;
   means for detecting a process value representing an operating state or a traveling state of the internal combustion engine;
   means for detecting whether or not said process value reaches a quasi-upper limit value representing a value smaller than a predetermined upper limit value;
   means for restricting, when said process value reaches said quasi-upper limit value, fuel injection of said upstream fuel injection valve; and
   means for restricting, when said process value reaches said upper limit value, fuel injection of said downstream fuel injection valve.

9. The fuel injection system for an internal combustion engine according to claim 8, wherein said means for restricting said fuel injection stops fuel of said upstream fuel injection valve and causes said downstream fuel injection valve to perform a thinned-out injection.

10. The fuel injection system for an internal combustion engine according to claim 8, further comprising an injection rate determination unit including a matrix of predetermined throttle opening and engine speed values for determining the upper limit value at which said fuel therein is restricted.

11. The fuel injection system for an internal combustion engine according to claim 8, wherein the upper limit value of the upstream fuel injection valve is lower than the upper limit value of the downstream fuel injection valve.

12. The fuel injection system for an internal combustion engine according to claim 8, wherein the fuel injection of the upstream fuel injection valve is stopped prior the fuel injection of the downstream fuel injection valve.

13. The fuel injection system for an internal combustion engine according to claim 9, further comprising an injection quantity restriction unit having a predetermined thinned-out pattern for each of a plurality of gear positions.

14. The fuel injection system for an internal combustion engine according to claim 9, wherein said means for restricting said fuel injection stops fuel of said upstream fuel injection valve and causing said downstream fuel injection valve to perform the thinned-out injection is activated when an engine speed approaches a predetermined upper output limit.

15. A method for injecting fuel in an internal combustion engine with a fuel injection system, the fuel injection system having an intake pipe equipped with a throttle valve; an upstream fuel injection valve provided upstream from said throttle valve; a downstream fuel injection valve provided downstream from said throttle valve, the method comprising the steps of:
   detecting a process value representing an operating state or a traveling state of the internal combustion engine;
   restricting fuel injection of each of said fuel injection valves when said process value reaches a predetermined upper limit value; and
   stopping said fuel injection of the upstream fuel injection valve prior to said the fuel injection of the downstream fuel injection valve.

16. The method for injecting fuel in an internal combustion engine according to claim 15, further comprising the step of arbitrarily adjusting fuel distribution between the upstream fuel injection valve and the downstream fuel injection valve based the process value detected.

17. The method for injecting fuel in an internal combustion engine according to claim 15, wherein the predetermined upper limit values of the upstream fuel injection valve and the downstream fuel injection valve are function of a throttle opening value and an engine speed value.

* * * * *